C. E. COX.
AUTOMOBILE.
APPLICATION FILED OCT. 29, 1909.

962,626.

Patented June 28, 1910.
2 SHEETS—SHEET 1.

Witnesses
Walter Troemel.
Thomas W. McMeans

Inventor
Claude E. Cox.
By Bradford Hood
Attorneys

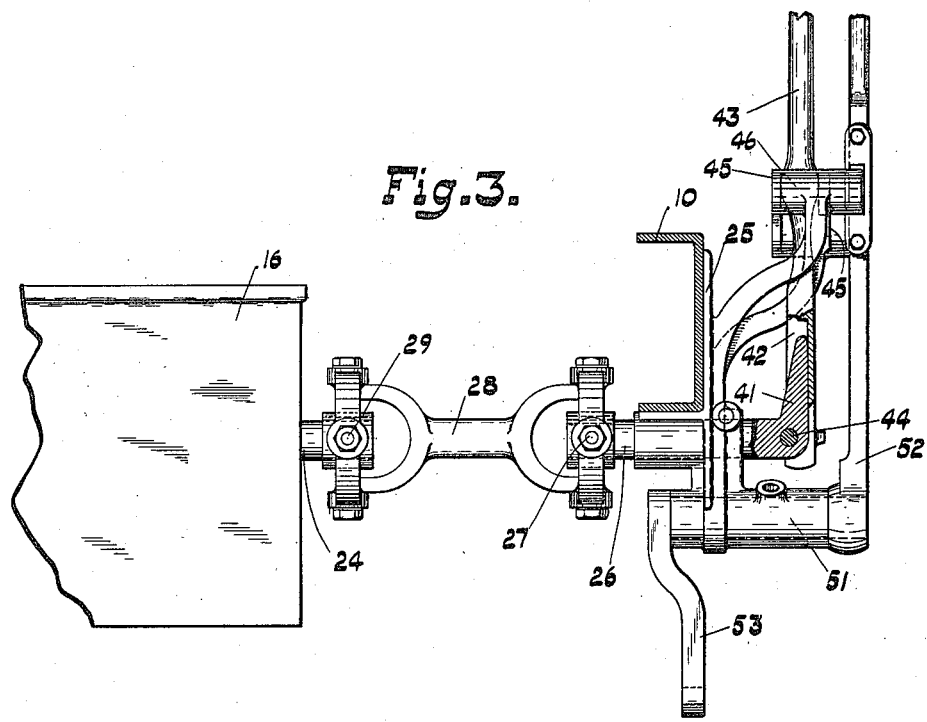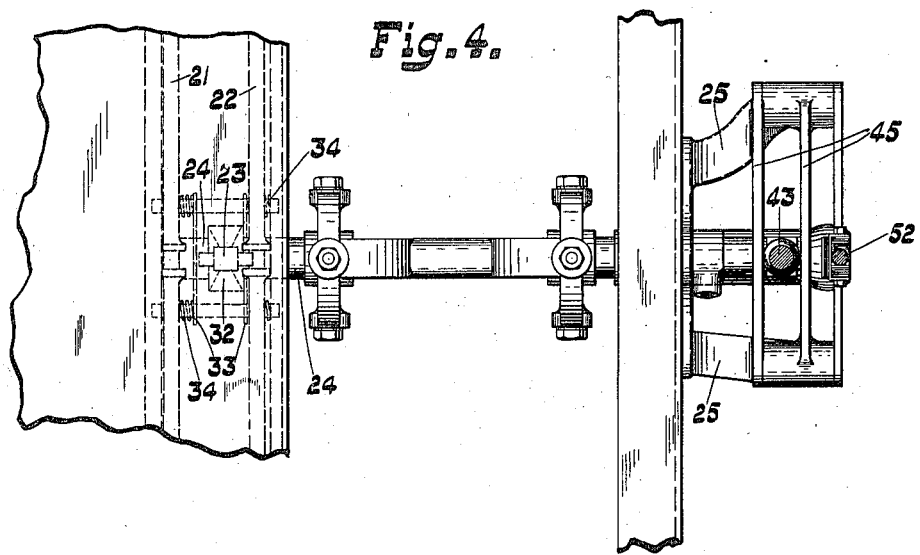

UNITED STATES PATENT OFFICE.

CLAUDE E. COX, OF MINNEAPOLIS, MINNESOTA.

AUTOMOBILE.

962,626.

Specification of Letters Patent.   Patented June 28, 1910.

Application filed October 29, 1909.   Serial No. 525,365.

*To all whom it may concern:*

Be it known that I, CLAUDE E. COX, a citizen of the United States, residing at Minneapolis, in the county of Hennepin and State of Minnesota, have invented certain new and useful Improvements in Automobiles, of which the following is a specification.

In certain types of automobile construction it has been found desirable to arrange the speed varying transmission gearing upon a forwardly extending member which is connected to and partakes of the movement of the rear axle structure, motion being transmitted to the transmission gearing from the motor through a suitable universal joint which is generally arranged at approximately the center of the yielding connection between the main frame and the rear axle structure. In such a construction difficulty is experienced in providing mechanism by means of which the speed varying gears can be shifted relative to each other, the most usual construction being one in which the controlling levers partake of the movement of the body of the speed changing transmission (considered as a whole) relative to the main frame. Such a construction is objectionable to many drivers owing to the constant movement of the controlling members and the object of my present invention is therefore to produce a construction by means of which the controlling levers or controlling member may be mounted upon the main frame and yet connected to the speed varying transmission gearing in such manner that the bodily movement thereof relative to the main frame will not interfere with the proper manipulation and maintenance of the various portions of the transmission gearing relative to each other.

The accompanying drawings illustrate an embodiment of my invention.

Figure 1:
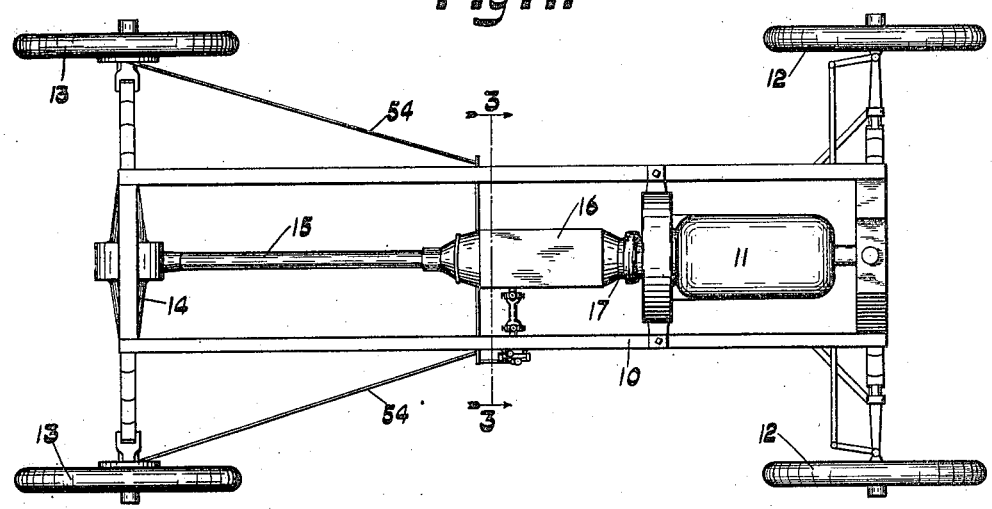
Figure 2:
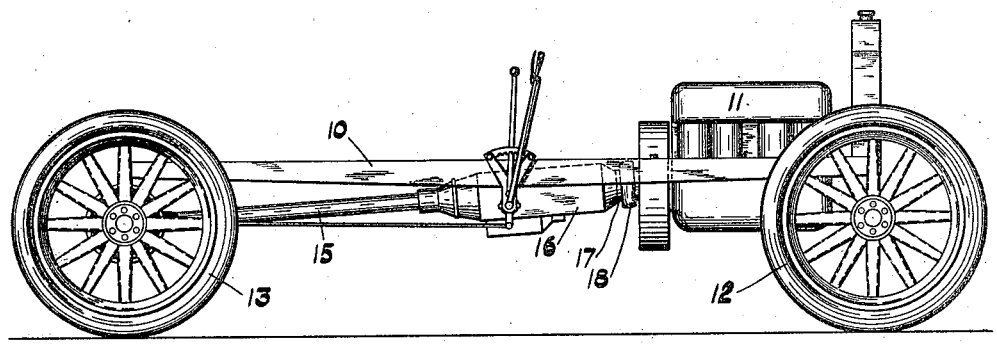

Figure 1 is a diagrammatic illustration of the main frame, controlling lever, brake lever, and associated parts; Fig. 2 a side elevation thereof; Fig. 3 a vertical section on line 3 3 of Fig. 1, on an enlarged scale, and Fig. 4 a plan of the parts shown in Fig. 3.

In the drawings, 10 indicates the main frame, 11 the motor carried thereby, 12 the forward wheels, 13 the rear wheels, and 14 the rear axle structure, all of any desired construction. The rear axle structure comprises a forwardly and upwardly extending member 15 which comprises the casing 16 of suitable speed changing transmission gearing of any desired type and at the forward end this casing is provided with a ball 17 which is mounted within a socket 18 carried by the main frame so that the rear axle structure has a ball and socket connection with the main frame, the main drive shaft from the engine connecting with the initial shaft of the transmission gearing by means of the joint within the ball and socket in a well known manner, or in any other desirable and suitable way.

The transmission gearing is of such character as to be capable of three or four different relative arrangements and for this purpose there are provided two shifting members 21 and 22 each of which is capable of a forward and backward movement, in a well known manner. Lying between these two members 21 and 22, and capable of engaging and operating either of said members, is an operating arm 23 which is carried by a rock shaft 24 journaled in the casing 16 and capable of enough axial movement, to either side of its medial position, to permit arm 23 to be thrown into engagement with either arm 21 or arm 22.

Thus far the particular construction forms no part of my present invention, the drawings, as to these parts, being merely diagrammatic.

It has heretofore been proposed to connect the controlling lever, by means of which the shaft 24 is rocked and shifted, directly to said shaft, the controlling member thus partaking of the movement of the casing 16 about the ball and socket joint. Such a construction however is objectionable because of the considerably amplified movement of the upper end of the controlling lever. My improved construction however permits the placing of the controlling lever upon a fixed member of the seat frame. For this purpose I provide a bracket 25 which is secured to one of the side members of the frame 10. Journaled in bracket 25 is a substantially horizontal shaft 26 which, at its inner end is connected, by a universal joint structure 27, with a link or shaft section 28, which, in turn, is connected by a universal joint structure 29 with shaft 24. Shaft 24 is provided with a collar 32 which lies between a pair of plates 33, 33 which are urged against the collar 32 in opposite directions by springs 34, thus normally tending to bring the shaft 24 to its medial axial position.

At its outer end, shaft 26 is provided with a transverse extension or finger 41 which lies within a groove 42 formed in the lower end of the controlling lever 43. Lever 43 is connected to shaft 26 by a pivot pin 44 which lies substantially at right angles to the groove 42 so that, while lever 42 may have a limited swing about pivot 44, the finger 41 of shaft 26 will at all times remain within groove 42 so that the shaft 26 will partake of any rocking movement of lever 43 about the axis of shaft 26. Lever 43 extends upwardly between a pair of guide plates 45 carried by bracket 25 and said lever is provided, between the guide plates 45, with a globular swelling 46 which serves as a pivot upon which the lever 43 may have a limited swing, between the plates 45 as fulcrums, upon an axis substantially parallel with the axis of pivot pin 44. Bracket 25 may also carry a rock shaft 51 to one end of which is secured a brake-controlling lever 52 and to the opposite end of which is secured a lever 53 to which may be connected suitable links 54 extending back to the brakes.

The operation is as follows: Movement of the transmission casing 16 relative to the main frame 10 is permitted by reason of the universal joints 27 and 29. Shaft 24 may be moved axially by an outward or inward swing of the upper end of the controlling lever 43 (pivoting on the swelling 46) and this axial movement of shaft 24 will bring the arm 23 into engagement with one or the other of the shifting members of the transmission gearing whereupon said shifting members may be actuated by a forward or backward movement of the controlling lever 43 in a well known manner, this forward or backward movement rocking shafts 26 and 24.

I claim as my invention:

1. In an automobile, the combination, with the main frame and its supporting wheels, of a driving axle structure, a transmission gearing drivingly connected with the movable members of the driving axle structure and movable as a whole relative to the main frame, a controlling lever mounted upon the main frame and movable thereon in two planes, a rock shaft carried by the body of the transmission gearing and movable therein both rotatively and axially, a member carried by said rock shaft and adapted to engage with either of two shifting members comprised within the transmission gearing, and intermediate flexible connections between the controlling lever and said rock shaft, compensating the relative movement between the transmission gearing body and the main frame, whereby said rock shaft may be shifted both rotatively and axially by the controlling lever on the main frame.

2. In an automobile, the combination, with the main frame and its supporting wheels, the driving axle structure, and transmission gearing connected with and partaking of the movement of the driving axle structure, said transmission gearing comprising a controlling member for alternate engagement with two gear-controlling members, of an operating member mounted upon the main frame and capable of swing in two planes, and a laterally flexible connection between said member and the controlling member of the transmission gearing.

3. In an automobile, the combination, with the main frame and its supporting wheels, the driving axle structure, and transmission gearing connected with and partaking of the movement of the driving axle structure, said transmission gearing comprising a controlling member for alternate engagement with two gear-controlling members and capable of rotative and axial selective movement, of an operating member mounted upon the main frame and capable of swing in two planes, and a laterally flexible connection between said member and the controlling member of the transmission gearing.

4. In an automobile, the combination, with the main frame and its supporting wheels, the driving axle structure, and transmission gearing connected with and partaking of the movement of the driving axle structure, said transmission gearing comprising a controlling member for alternate engagement with two gear-controlled members, of an operating member mounted upon the main frame and capable of swing in two planes, a laterally flexible connection between said member and the controlling member of the transmission gearing, a shaft journaled upon the main frame and capable of both rotative and axial movement, a connection between said shaft and the last-mentioned controlling lever whereby said shaft may be moved both rotatively and axially by the controlling lever, and a shaft connection between said last-mentioned shaft and the controlling member of the transmission gearing, said shaft connection comprising a pair of universal joints, substantially as and for the purpose set forth.

5. In an automobile, the combination, with the main frame and its supporting wheels, the driving axle structure, and transmission gearing connected with and partaking of the movement of the driving axle structure, said transmission gearing comprising a controlling member for alternate engagement with two gear-controlling members and capable of rotative and axial selective movement, of an operating member mounted upon the main frame and capable of swing in two planes, a shaft journaled upon the main frame and capable of both rotative and axial movement, a connection between said shaft and the operating member whereby said shaft may be moved both rotatively and axially by the controlling lever, and a shaft connection between said last-mentioned shaft and the controlling member of the transmission gearing, said shaft connection comprising a pair of universal joints, substantially as and for the purpose set forth.

In witness whereof, I have hereunto set my hand and seal at Indianapolis, Indiana, this 27th day of October, A. D. one thousand nine hundred and nine.

CLAUDE E. COX. [L. s.]

Witnesses:
ARTHUR M. HOOD,
FRANK A. FAHLE.